US008836182B2

(12) United States Patent
Nishikata et al.

(10) Patent No.: US 8,836,182 B2
(45) Date of Patent: Sep. 16, 2014

(54) DISK DRIVE MOTOR (75) Inventors: Toshiyuki Nishikata, Tokyo (JP); Hideki Noto, Tokyo (JP)

(73) Assignee: Minebea Co., Ltd., Tokyo (JP)

( * ) Notice: Subject to any disclaimer, the term of this patent is extended or adjusted under 35 U.S.C. 154(b) by 230 days.

(21) Appl. No.: 13/577,029

(22) PCT Filed: Mar. 9, 2010

(86) PCT No.: PCT/JP2010/001635
§ 371 (c)(1),
(2), (4) Date: Aug. 3, 2012

(87) PCT Pub. No.: WO2011/101921
PCT Pub. Date: Aug. 25, 2011

(65) Prior Publication Data
US 2012/0299437 A1 Nov. 29, 2012

(30) Foreign Application Priority Data
Feb. 18, 2010 (JP) .................................. 2010-033124

(51) Int. Cl.
| H02K 7/00 | (2006.01) |
| H02K 7/08 | (2006.01) |
| G11B 17/04 | (2006.01) |
| G11B 17/28 | (2006.01) |
| G11B 17/028 | (2006.01) |
| G11B 19/20 | (2006.01) |

(52) U.S. Cl.
CPC ........ G11B 17/0282 (2013.01); G11B 19/2009 (2013.01)
USPC ............. 310/67 R; 310/90; 720/700; 720/703

(58) Field of Classification Search
USPC ........ 310/67 R, 90; 360/99.08; 384/100, 119; 720/700, 703
See application file for complete search history.

(56) References Cited

U.S. PATENT DOCUMENTS

| 6,249,505 B1 * | 6/2001 | Miyamoto et al. ............ 369/266 |
| 2002/0113503 A1 * | 8/2002 | Nagatsuka ................... 310/67 R |
| 2008/0201729 A1 | 8/2008 | Yamaguchi |
| 2010/0192169 A1 * | 7/2010 | Takeuchi et al. .............. 720/703 |

FOREIGN PATENT DOCUMENTS

| JP | 3852763 B2 | 12/2006 |
| JP | 2007-207369 A | 8/2007 |
| JP | 2008-204540 A | 9/2008 |

\* cited by examiner

Primary Examiner — Tran Nguyen
Assistant Examiner — Jose Gonzalez Quinone
(74) Attorney, Agent, or Firm — Carrier Blackman & Associates, P.C.; Joseph P. Carrier; William D. Blackman (57) ABSTRACT A ring-shaped back yoke and a ring-shaped magnet are provided on a bottom surface of a ring-shaped opening part formed at a central portion of an alignment ring of a turntable part. The back yoke is provided with a protruding pawl which protrudes in a direction perpendicular to a plane of the back yoke, and the alignment ring is provided with a through hole into which the protruding pawl is inserted when mounting the back yoke to the alignment ring. The protruding pawl of the back yoke and an upper surface of a rotor frame are fixed together using an adhesive.

4 Claims, 8 Drawing Sheets

DISK DRIVE MOTOR

TECHNICAL FIELD

The present invention relates to a disk drive motor which is mainly used in a personal computer and an AV device, and more particularly, to a configuration of a turntable.

BACKGROUND ART

In a media recording and reproducing device using a media disk, a turntable is fixed to a shaft of a spindle motor provided to the device, a disk is loaded and rotated on a disk loading surface of the turntable, and information is written and read out to and from the disk. The turntable having the media disk loaded thereon is rotated at high speed. Hence, when the loaded disk has a slight deviation or deflection with respect to an in-plane center of gravity, a rotation center of the disk in the plane is deviated due to a surface swinging. Therefore, an optical pickup of reading information from a track of the disk or recording information to a track of the disk is deviated from the track.

Hence, in order to further increase the jointing force of the rotating media disk, a following method has been suggested, for example. A central portion of the turntable is provided with an annular opening part, and the opening part is provided with a magnetic means. With the magnetic means, a clamper made of a magnetic metal thin plate such as iron plate provided to hold the loaded media disk is attracted. Accordingly, the media disk is strongly pressure-contacted in a direction of the disk loading surface of the turntable.

In general, since it is necessary to suppress rotational moment to the minimum, the turntable is made of a light synthetic resin. Also, regarding a structure of the magnetic means provided to the turntable, an annular magnet is fixed to the annular opening part of the central portion of the turntable or a back yoke made of a magnetic metal thin plate such as iron plate and an annular magnet are fixed.

Figure 7:
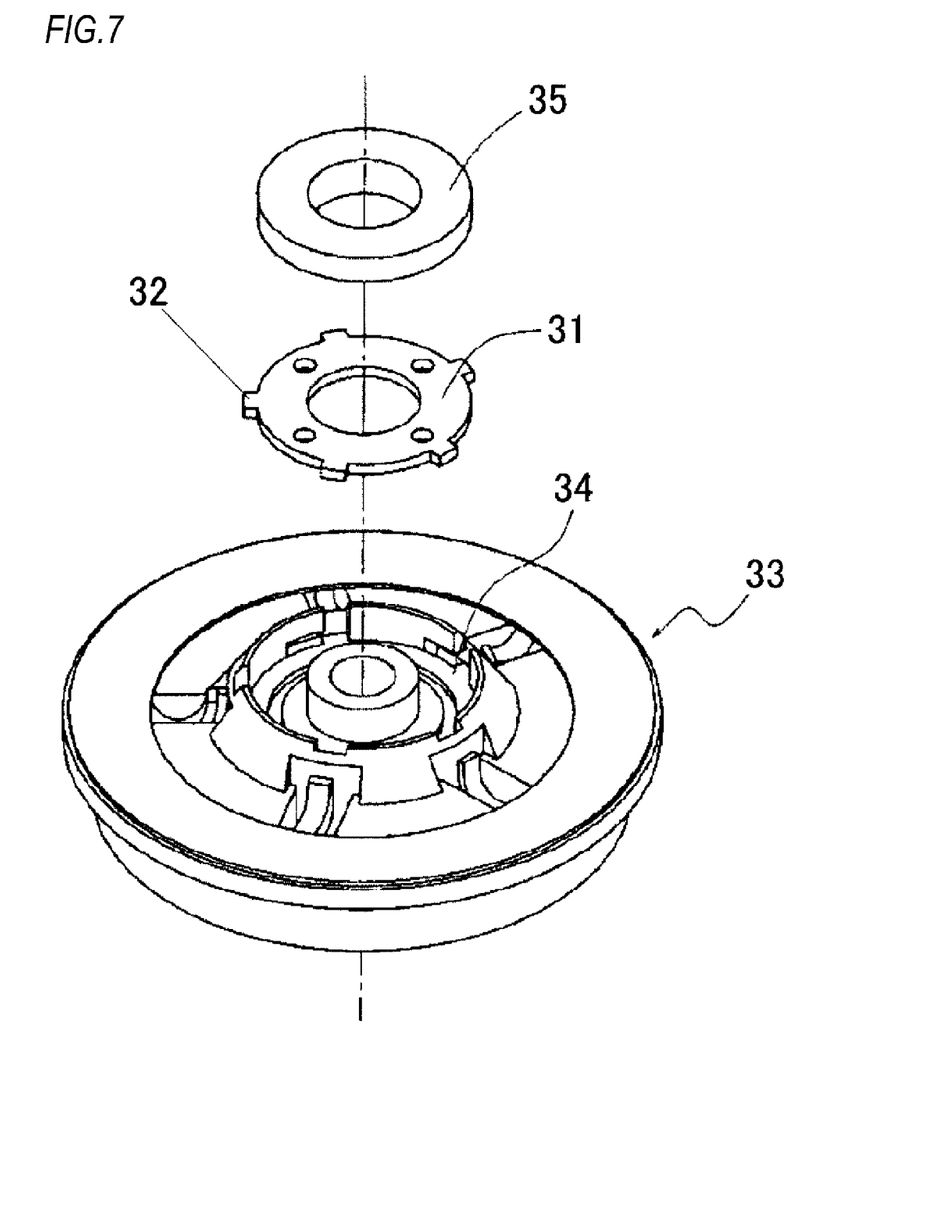
FIG. 7 is an exploded perspective view showing an assembling sequence of a conventional turntable part.
Figure 8:
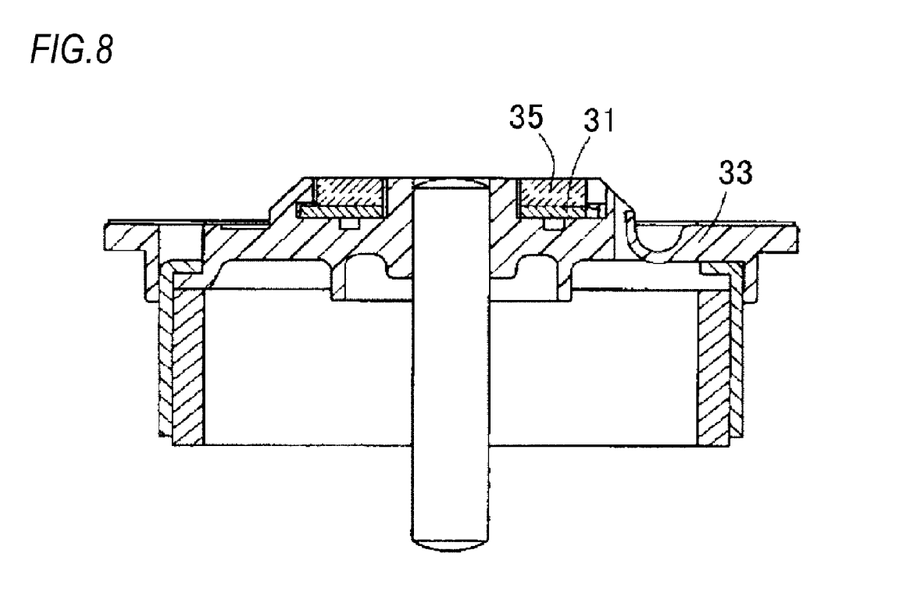
FIG. 8 is a sectional view showing a state where the conventional turntable part is assembled to a rotor.

Regarding the fixing method, the conventional method as shown in FIGS. 7 and 8 has been proposed (for example, refer to Patent Document 1). According to this conventional method, a plurality of protruding pawls 32 which are arranged to protrude from an outer peripheral edge of a back yoke 31 are integrally formed with the back yoke 31. Further, an outer peripheral wall of a ring-shaped opening part 34 at a central portion of a turntable part 33 is provided with vertical groove parts, horizontal groove parts and protrusion parts. The vertical groove parts are formed into a concave shape such that the protruding pawls 32 of the back yoke 31 can be fitted therein. The horizontal groove parts are notched into a substantial arc shape such that the protruding pawls 32 can rotate in the outer peripheral wall along a bottom surface of the opening part 34 from one sides of sidewall surfaces forming the vertical groove parts, respectively. The protrusion parts are provided in the vicinity of opening parts of the horizontal groove parts so as to regulate movement of the protruding pawls 32. Accordingly, the conventional method mechanically fixes the back yoke 31 to the turntable part 33.

However, in the above configuration, the back yoke 31 is simply mechanically fixed to the turntable part 33. Hence, the strength is insufficient and the back yoke 31 may be removed from the turntable part 33 due to the repetitive mounting and demounting of the clamper and the severe vibration and shock, so that the reliability is lowered.

Also, in order to improve the fixing strength between both members, it can be considered to use adhesive for the above configuration. However, when the back yoke 31 made of metal or clamp magnet 35 is adhered on the bottom surface of the ring-shaped opening part 34 of the turntable part 33 made of the synthetic resin, following problems are caused. That is, the synthetic resin has the considerably higher linear expansion coefficient than that of the metal or magnet. Hence, a considerable difference in the linear expansion coefficient occurs depending on a thermal condition of the using environment, so that the adhesion is forcibly detached and the back yoke 31 is removed from the adhesion part. Also, as time goes, the distortion is caused on the bottom surface of the ring-shaped opening part 34 of the turntable part 33 having the back yoke 31 adhered thereto, so that the adhesion is forcibly detached and the back yoke 31 is removed from the adhesion part.

CITATION LIST

Patent Literature

Patent Document 1: JP-B-3852763

SUMMARY OF INVENTION

The present invention provides a disk drive motor including a disk clamp mechanism with high reliability while employing a configuration of strongly fixing a back yoke to a turntable part by an adhesive.

The invention provides a disk drive motor including a disk clamp mechanism configured such that a ring-shaped back yoke and a ring-shaped magnet are provided on a bottom surface of a ring-shaped opening part formed at a central portion of an alignment ring of a turntable part. In the disk drive motor of the present invention is configured such that the back yoke is provided with a protruding pawl which protrudes in a direction perpendicular to a plane of the back yoke, the alignment ring is provided with a through hole into which the protruding pawl is inserted when mounting the back yoke to the alignment ring, and the protruding pawl of the back yoke and an upper surface of a rotor frame are fixed together using an adhesive.

According to the above configuration, the back yoke made of metal and the rotor frame made of metal are adhered and fixed using the adhesive, and there is little difference in the linear expansion coefficient. Therefore, there is no concern about the peeling off due to change in temperature or time and the back yoke can be securely fixed to the turntable part with the sufficient strength. Also, the back yoke is not removed from the turntable part due to the repetitive mounting and demounting of the clamper and the severe vibration and shock. Therefore, according to the present invention, it is possible to realize a disk drive motor including a disk clamp mechanism with high reliability.

EMBODIMENT FOR CARRYING OUT INVENTION

Hereinafter, embodiments of the present invention will be described with reference to the drawings.

(Embodiments)

Figure 1:
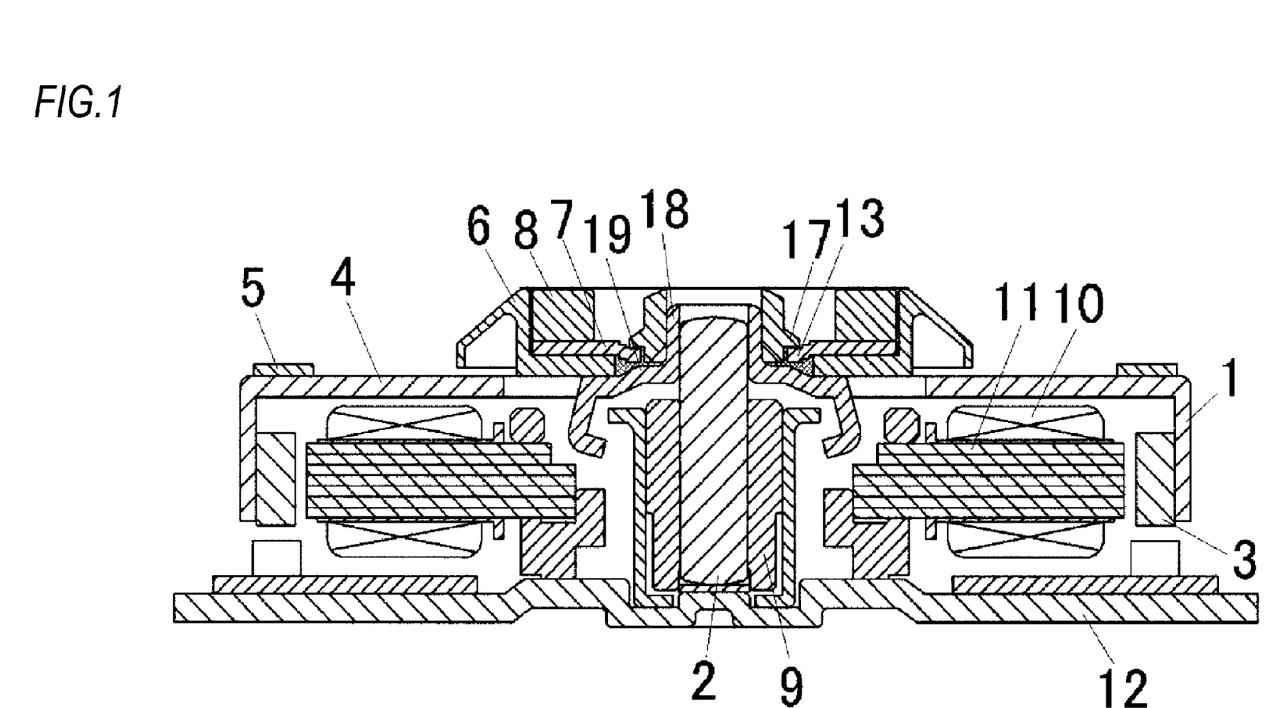
FIG. 1 is a sectional view of a disk drive motor according to an embodiment of the present invention.

FIG. 1 is a sectional view of a disk drive motor according to an embodiment of the present invention.

First, a schematic configuration of the disk drive motor is described. In FIG. 1, the disk drive motor mainly includes a rotor assembly and a stator assembly.

The rotor assembly includes a rotor frame 1, a shaft 2, a rotor magnet 3, a rubber sheet 5, an alignment ring 6, a back yoke 7 and a clamp magnet 8. The rotor frame 1 has a substantial cup shape. The shaft 2 is fixed to the rotor frame 1. The rotor magnet 3 is fixed on an inner periphery of the rotor frame 1 and has a ring shape. The rubber sheet 5 is attached to a turntable part 4 of an upper surface of the rotor frame 1. The alignment ring 6 is provided to align an inner diameter part of a disk and has a substantially circular shape. The back yoke 7 and the clamp magnet 8 are accommodated in the alignment ring 6.

In the meantime, the stator assembly includes a bearing 9, a stator core 11 and a bracket 12. The bearing 9 rotatably supports the shaft 2. The stator core 11 is arranged to face the rotor magnet 3 and is wound with a winding wire. The bearing 9 and the stator core 11 are fixed to the bracket 12.

A media disk (not shown) is loaded on the alignment ring 6 of the disk drive motor. Above the media disk, a clamper (not shown) which accommodates a magnetic member for attracting the clamp magnet 8 is positioned. That is, with the disk being interposed between the rubber sheet 5 and the clamper, the clamper secures a holding force of the disk by a pressing force with which the clamp magnet 8 is attracted. Also, the clamper is attached to a disk drive (not shown) side having the disk drive motor mounted thereon.

In the below, a method of fixing the back yoke 7 accommodated in the alignment ring 6 to the turntable 7 is described.

Figure 2:
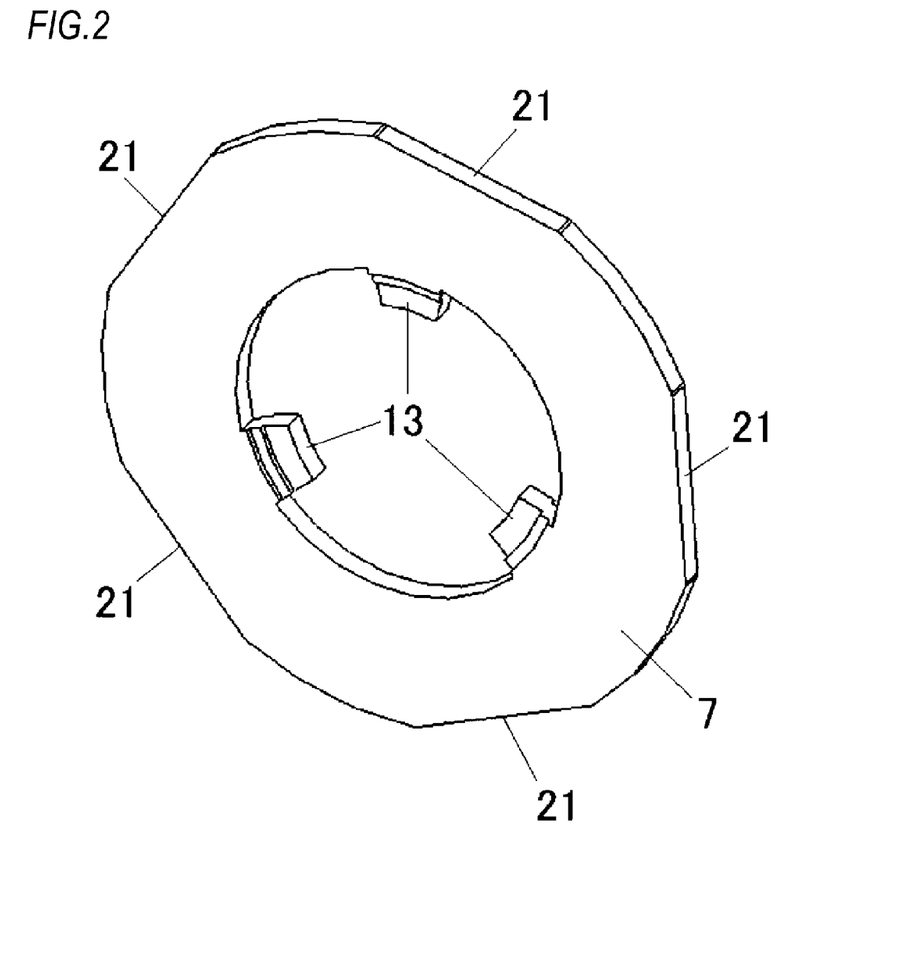
FIG. 2 is a perspective view showing a back yoke in the embodiment.
Figure 3:
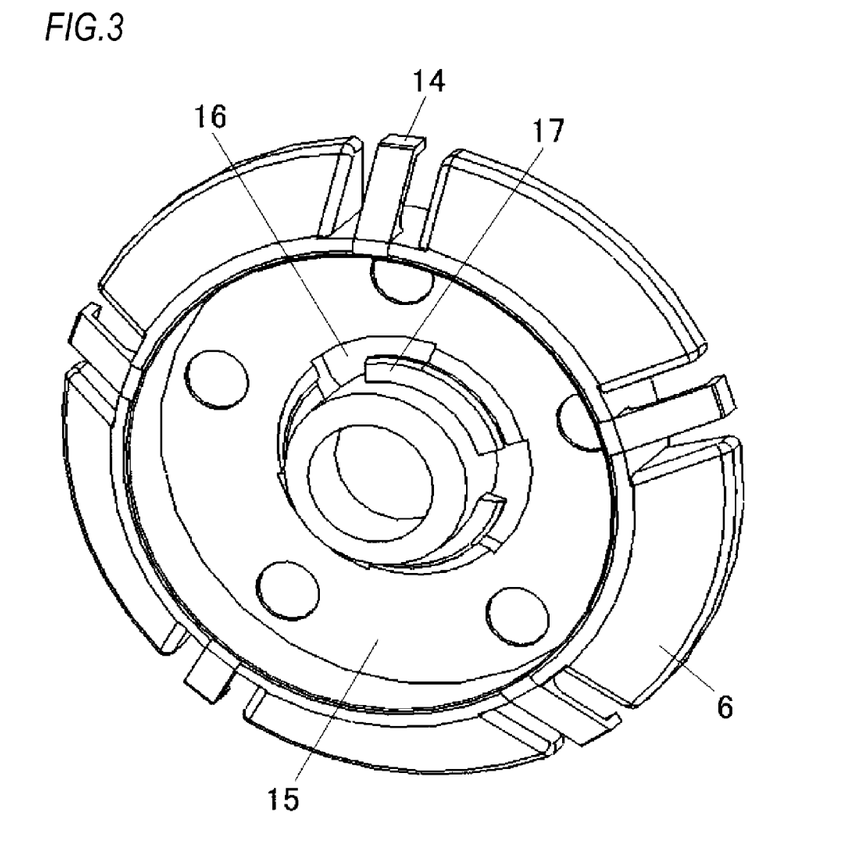
FIG. 3 is a perspective view showing an alignment ring in the embodiment.
Figure 4:
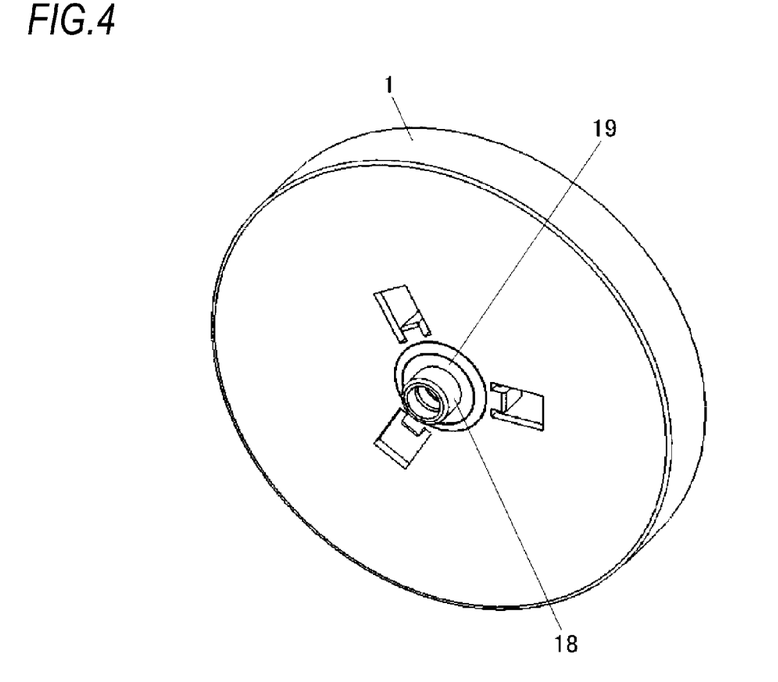
FIG. 4 is a perspective view showing a rotor frame in the embodiment.

The back yoke 7 is made of a magnetic metal thin plate and has a substantial ring shape as shown in FIG. 2. In an inner diameter part of the back yoke 7, a plurality of protruding pawls 13 which protrude in a direction perpendicular to a plane of the back yoke 7 is formed by an integration molding method such as pressing. The alignment ring 6 made of resin is formed at an outer peripheral part thereof with disk alignment pawls 14 by a resin molding and is formed at a central portion thereof with a ring-shaped opening part 15 which accommodates the back yoke 7 and the clamp magnet 8, as shown in FIG. 3. Furthermore, the ring-shaped opening part 15 is formed at an inner diameter side thereof with through holes 16 by the same number as the protruding pawls 13, into which the protruding pawls 13 of the back yoke 7 are inserted. The through hole 16 is formed at an axial upper side with an engaging part 17 which contacts the protruding pawl 13. As shown in FIGS. 1 and 4, the rotor frame 1 is formed into a substantial cup shape by press molding a metal plate. Furthermore, the rotor frame 1 is provided with a step part 19 which is raised to have a circumferential shape at a part of a surrounding of a burring part 18 for pressure-fixing the shaft 2

Figure 5A:
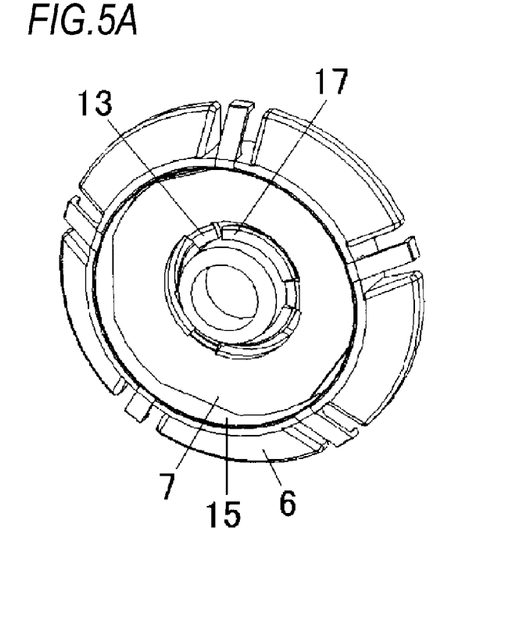
FIG. 5A is a perspective view showing a state where the back yoke is being assembled to the alignment ring in the embodiment.
Figure 5B:
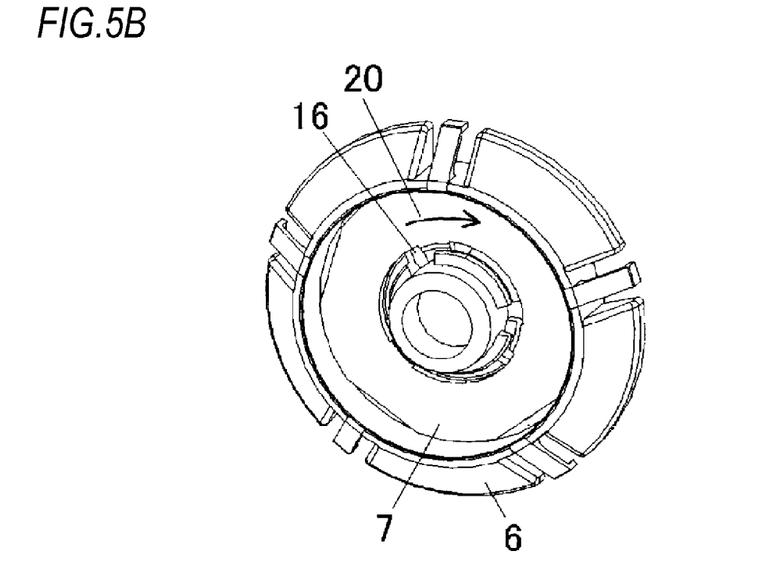
FIG. 5B is a perspective view showing a next state where the back yoke and the alignment ring are being assembled.
Figure 5C:
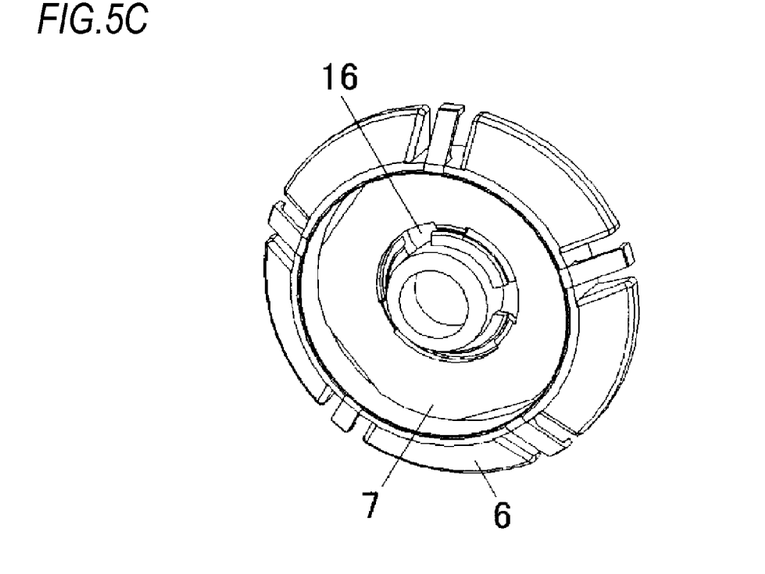
FIG. 5C is a perspective view showing a state where the back yoke and the alignment ring have been assembled.
Figure 6:
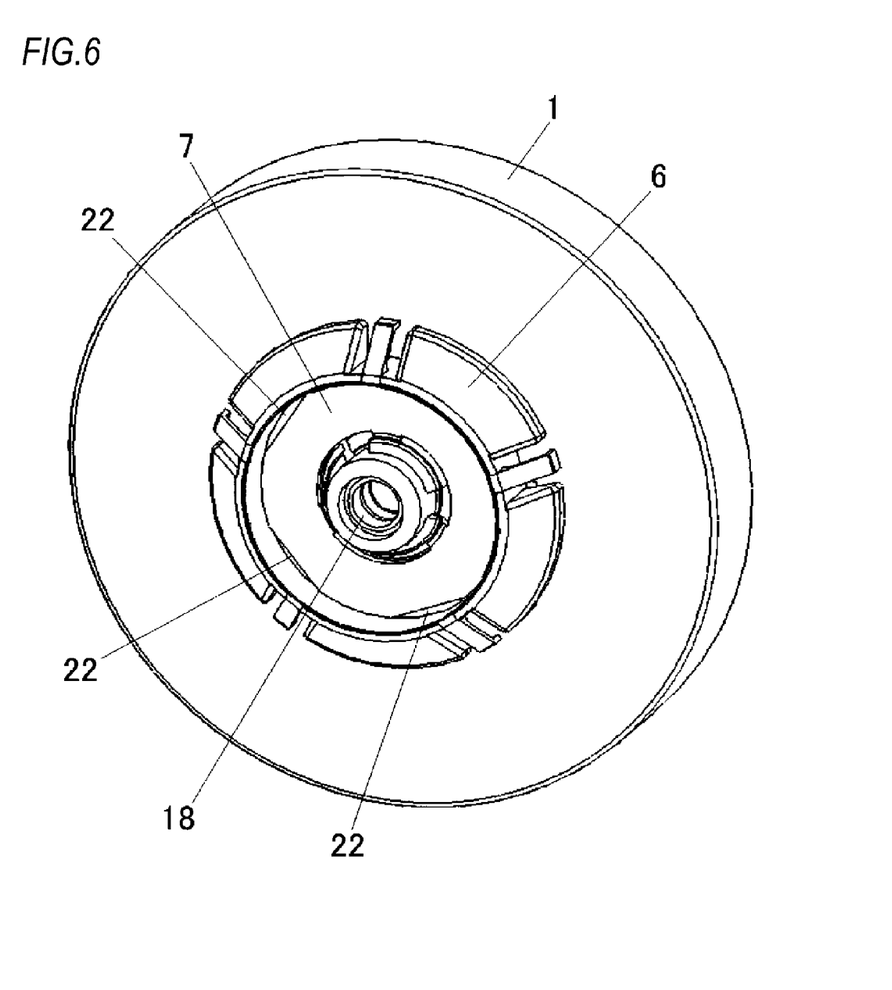
FIG. 6 is a perspective view showing a state where an assembled product having the back yoke and the alignment ring is assembled to the rotor frame.

As shown in FIG. 5A, the back yoke 7 is mounted to the ring-shaped opening part 15 of the alignment ring 6 while matching circumferential positions of the protruding pawls 13 with circumferential positions of the through holes 16 of the alignment ring 6. When a backside of the back yoke 7 reaches the bottom surface of the ring-shaped opening part 15, the back yoke 7 is rotated in a clockwise direction 20 such that the protruding pawls 13 of the back yoke 7 are fitted under the engaging parts 17 of the alignment ring 6, as shown in FIG. 5B. When the protruding pawls 13 of the back yoke 7 are rotated to positions at which they contact sidewalls of the through holes 16 of the alignment ring 6, respectively, as shown in FIG. 5C, the mounting of the back yoke 7 to the alignment ring 6 is completed. After that, the assembled product is lightly press-fitted to the rotor frame 1, as shown in FIG. 6. At this time, an adhesive is applied to the burring part 18 of the rotor frame 1, and when the alignment ring 6 is press-fitted, the adhesive flows to the step part 19 of the rotor frame 1 while the adhesive is pressed by an inner diameter part of a central hole of the alignment ring 6. Then, the alignment ring 6 is press-fitted up to a position at which it contacts an upper surface of the rotor frame 1, and the protruding pawls 13 of the back yoke 7 and the step part 19 of the rotor frame 1 are adhesively fixed by the adhesive gathered in the vicinity of the step part 19 of the rotor frame 1. Accordingly, the protruding pawls 13 of the back yoke 7 and the upper surface of the rotor frame 1 are fixed using the adhesive. It is noted that when the adhesive flows in the vicinity of the step part 19 of the rotor frame 1, the back yoke 7 is apt to lift up. However, since the protruding pawls 13 of the back yoke 7 come in contact with the engaging parts 17 of the alignment ring 6, it is possible to suppress the uplifting of the back yoke 7 by the engaging parts 17 and the back yoke 7 is securely fixed to the rotor frame 1.

The clamp magnet 8 is adhesively fixed to the back yoke 7 after the back yoke 7 has been adhesively fixed to the rotor frame 1.

As described above, the back yoke 7 is fixed to the rotor frame 1 by using the adhesive. Thereby, it is possible to obtain the sufficient fixing strength which cannot be secured by the mechanical fixing only. Therefore, the back yoke is not removed even by frequent and repetitive mounting and demounting of the clamper, and the severe vibration and shock. Also, the back yoke 7 is adhered to the rotor frame 1, and they are made of the same magnetic metal materials which have little difference in the linear expansion coefficient. Therefore, there is no concern about the peeling off of the adhesion of the back yoke 7 due to change in temperature or time and it is possible to realize a disk drive motor including a disk clamp mechanism with high reliability.

Also, as shown in FIG. 2, the outer peripheral shape of the back yoke 7 may be circular or may have a substantially polygonal shape in which notches are discontinuously formed on the outer periphery and a plurality of linear portions 21 is formed. With this shape, when adhesively fixing the clamp magnet 8 to the back yoke 7, it is possible to provide gaps 22 between an outer diameter of the ring-shaped opening part 15 of the alignment ring 6 and the linear portions 21 of the back yoke 7, as shown in FIG. 6. As the gaps 22 are formed, it is possible to sufficiently fill with adhesive not only the upper surface of the back yoke 7 but also the gaps 22, so that it is possible to adhesively fix the back yoke 7 and the clamp magnet 8 more strongly. Thereby, it is possible to realize a disk drive motor including a disk clamp mechanism with higher reliability.

Industrial Applicability

Since it is possible to adhesively fix the back yoke and the clamp magnet more strongly, the disk drive motor according to the present invention is useful as a disk drive motor which is used a personal computer and an AV device.

DESCRIPTION OF REFERENCE NUMERALS

- 1: rotor frame
- 2: shaft
- 3: rotor magnet
- 4, 33: turntable part
- 5: rubber sheet
- 6: alignment ring
- 7, 31: back yoke
- 8, 35: clamp magnet
- 9: bearing
- 10: winding wire
- 11: stator core
- 12: bracket
- 13, 32: protruding pawl
- 14: disk alignment pawl
- 15, 34: ring-shaped opening part
- 16: through hole
- 17: engaging part
- 18: burring part
- 19: step part
- 20: clockwise direction
- 21: linear portion
- 22: gap

The invention claimed is:

1. A disk drive motor including a disk clamp mechanism configured such that a ring-shaped back yoke and a ring-shaped magnet are provided on a bottom surface of a ring-shaped opening part formed at a central portion of an alignment ring of a turntable part, wherein the back yoke is provided with a protruding pawl which protrudes in a direction perpendicular to a plane of the back yoke, the alignment ring is provided with a through hole into which the protruding pawl is inserted when mounting the back yoke to the alignment ring, and the protruding pawl of the back yoke and an upper surface of a rotor frame are fixed together using an adhesive.

2. The disk drive motor according to claim 1, wherein the protruding pawl is provided on an inner diameter side of the back yoke, and the through hole is provided on an inner diameter side of the ring-shaped opening part of the alignment ring.

3. The disk drive motor according to claim 1, wherein an engaging part which contacts the protruding pawl of the back yoke and prevents the back yoke from uplifting when adhering the back yoke and the rotor frame is provided at an axial upper side of the through hole of the alignment ring.

4. The disk drive motor according to claim 1, wherein an outer periphery of the back yoke is discontinuously formed with notches such that the back yoke has an outer shape of a substantial polygon.

\* \* \* \* \*